United States Patent [19]

Suzuki et al.

[11] Patent Number: 4,836,691
[45] Date of Patent: Jun. 6, 1989

[54] MEDICAL BAG AND METHOD FOR PREPARING THE SAME

[75] Inventors: Tatsuo Suzuki, Tokyo; Keinosuke Isono, Kawaguchi, both of Japan

[73] Assignee: Material Engineering Technology Laboratory Inc., Tokyo, Japan

[21] Appl. No.: 163,299

[22] Filed: Mar. 2, 1988

[30] Foreign Application Priority Data

Mar. 4, 1987 [JP] Japan ................... 62-50650

[51] Int. Cl.$^4$ ................ B65D 33/16; B32B 31/00
[52] U.S. Cl. ................... 383/80; 156/272.4; 156/274.2; 156/294; 493/189; 493/213; 493/929
[58] Field of Search ............. 383/80, 94, 96, 904; 493/189, 213, 929; 156/272.4, 273.7, 273.9, 274.2, 294; 219/10.41, 10.53, 10.57

[56] References Cited

U.S. PATENT DOCUMENTS

| | | | |
|---|---|---|---|
| 2,642,866 | 6/1953 | Smith | 383/96 X |
| 3,454,442 | 7/1969 | Heller, Jr. | 383/94 X |
| 3,700,513 | 10/1972 | Haberhauer et al. | 156/272.4 X |
| 3,725,630 | 4/1973 | Gagliardi | 156/274.2 X |
| 3,945,867 | 3/1976 | Heller, Jr. et al. | 156/273.9 X |
| 4,028,156 | 6/1977 | Clark et al. | 383/80 X |
| 4,126,167 | 11/1978 | Smith et al. | 383/80 X |
| 4,479,844 | 10/1984 | Yamada | 493/189 X |
| 4,521,659 | 6/1985 | Buckley et al. | 156/273.9 X |
| 4,539,456 | 9/1985 | Mohr | 156/274.2 X |
| 4,650,452 | 3/1987 | Jensen | 493/213 X |
| 4,704,509 | 11/1987 | Hilmersson et al. | 156/274.2 X |
| 4,740,663 | 4/1988 | Roth et al. | 156/274.2 X |
| 4,754,113 | 6/1988 | Mohr et al. | 156/274.2 X |
| 4,770,442 | 9/1988 | Sichler | 156/273.9 X |

*Primary Examiner*—Jimmy G. Foster
*Assistant Examiner*—Nova S. Tucker
*Attorney, Agent, or Firm*—Schmeiser, Morelle & Watts

[57] ABSTRACT

A medical bag and method of manufacturing the bag from a thermoplastic resin by irradiating a ferromagnetic heating element which has been prepositioned between the mouth and receiving portions of the bag and which is caused to generate high frequence-induced heat. During subjection of the heating element to a high frequency magnetic field, the mouth portion and receiving portion of the bag melt about the element so that mouth portion, element and receiving portion are bonded together. This technique can also be suitably used for thermoplastic resins, for example, polyolefin resins, to which conventional high-frequency bonding cannot be applied.

9 Claims, 3 Drawing Sheets

MEDICAL BAG AND METHOD FOR PREPARING THE SAME

BACKGROUND OF THE INVENTION (1) Field of the Invention

The present invention relates to a medical bag. In particular, it relates to a medical bag capable of receiving an infusion fluid, an elemental diet (hereinafter referred to simply as ED), an antibiotic or the like used in a closed medical system, and a method for preparing the medical bag.

More particularly, the present invention relates to a medical bag in which a mouth portion and a receiving portion are bonded together by high frequency (hereinafter may also be denoted HF) induction heating, and a method for preparing the medical bag.

(2) Description of the Prior Art

In recent years, the employment of a closed system increases in infusion therapy and the like in order to prevent liquid contents therein from contacting the outside. A medical bag is used in this closed system, and the liquid contents in the medical bag are discharged therefrom under the influence of gravity on the contents themselves as well as the structure of the bag and the flexibility of a material of the bag. Further, this kind of medical bag must have heat resistance which can withstand autoclave sterilization to sterilize the contents therein. It is preferred that the medical bag be made from a transparent material so that the contents therein can be monitored from the outside. For this purpose, flexible polyvinyl chloride resin and ethylene-vinyl acetate copolymer are mainly used as raw materials for the medical bags.

In addition, there is a modified medical bag in which the mouth member and the receiving member are made from a polyolefin resin and a bond portion of the mouth member is formed into a boat shape or the like so as to enable heat sealing.

On the other hand, ED and antibiotics are hermetically preserved in the form of a freeze-dried powder in aluminum packs, glass bottles and the like and are prepared when used, and therefore they could not be utilized in the closed system.

With regard to a bonding process which uses radiofrequency induction heating, when materials to be bonded are ferromagnetic substances, there is generally used a process which comprises first interposing a thermoplastic resin adhesive between these materials, and then causing the ferromagnetic materials to generate heat in a magnetic field, whereby the thermoplastic resin adhesive is melted and the materials are thus bonded to each other; and when materials to be bonded are non-ferromagnetic substances, there is generally used a process which comprises first interposing a thermoplastic resin adhesive containing a magnetic substance between these materials, and then melting the adhesive in a magnetic field, whereby the materials are bonded to each other.

The conventional medical bags are often made from flexible polyvinyl chloride and ethylene-vinyl acetate copolymer. This reason is that flexible polyvinyl chloride and ethylene-vinyl acetate have a high dielectric loss and thus the mouth portion and the receiving portion of the medical bag can be easily bonded together by means of the radiofrequency induction heating. However, flexible polyvinyl chloride contains a great deal of a plasticizer, and therefore there is the problem of safety that the plasticizer might dissolve into the liquid contents in the medical bag. As for ethylene-vinyl acetate copolymer, acetic acid might separate out therefrom at the time of molding and similarly might dissolve into the liquid contents therein, and furthermore, ethylene-vinyl acetate copolymer, if not treated additionally, does not have such heat resistance as to withstand autoclave sterilization. Hence, it is necessary that ethylene-vinyl acetate copolymer be irradiated with a radiation in order to form a crosslinked structure therein, thereby providing the copolymer with the heat resistance. In the conventional manufacturing method of the bags, such an additional process has been required. Now, safe and inexpensive polyolefin resins, having excellent physical properties, are demanded.

However, it has been extremely difficult to manufacture desired medical bags by the use of such polyolefin resins. In general, the polyolefin resin does not release heat enough to melt itself even when a high-frequency electric field is applied, because the dielectric loss of the polyolefin resin is low. In consequence, the polyolefin resin cannot be sealed by high-frequency bonding, in constrast to flexible polyvinyl chloride, ethylene-acetic acid copolymer and the like. For example, when two laminated polyolefin sheets of the medical bag are melted and bonded to a mouth member having a cylindrical outer periphery or the like by means of impulse sealing or heat sealing, it is difficult to melt and bond the sheet laminate and a material of the mouth member which are different in wall thickness, since the impulse sealing, which is in contrast to the high-frequency sealing, is not effective to melt and bond the materials having a complex shape, and since in the heat sealing, heat is given from the outside. In consequence, the mouth member having a small diameter cannot be joined well to the upper portion of the medical bag. There has been suggested a method in which the bond portion of the mouth member is deformed so that the shape of the bond portion may be as close as possible to a plane, with the intention of facilitating the bond of the mouth member and the receiving portion. In this case, however, the seal of the bonded portion is incomplete and the liquid contents therein leak out on occasion, and in addition there is the problem that the manufacturing cost is high.

SUMMARY OF THE INVENTION

An object of the present invention is to provide a suitable medical bag such as an infusion fluid bag, an ED bag, an antibiotic bag and a piggy bag. According to the present invention, there is provided a medical bag made from a thermoplastic resin and having a mouth portion and a receiving portion which is prepared by positioning a ferromagnetic heating element between the mouth portion and the receiving portion, and causing the heating element to generate heat by high frequency (HF) induction heating, whereby the mouth portion and the receiving portion are melted and bonded together.

Figure 1:
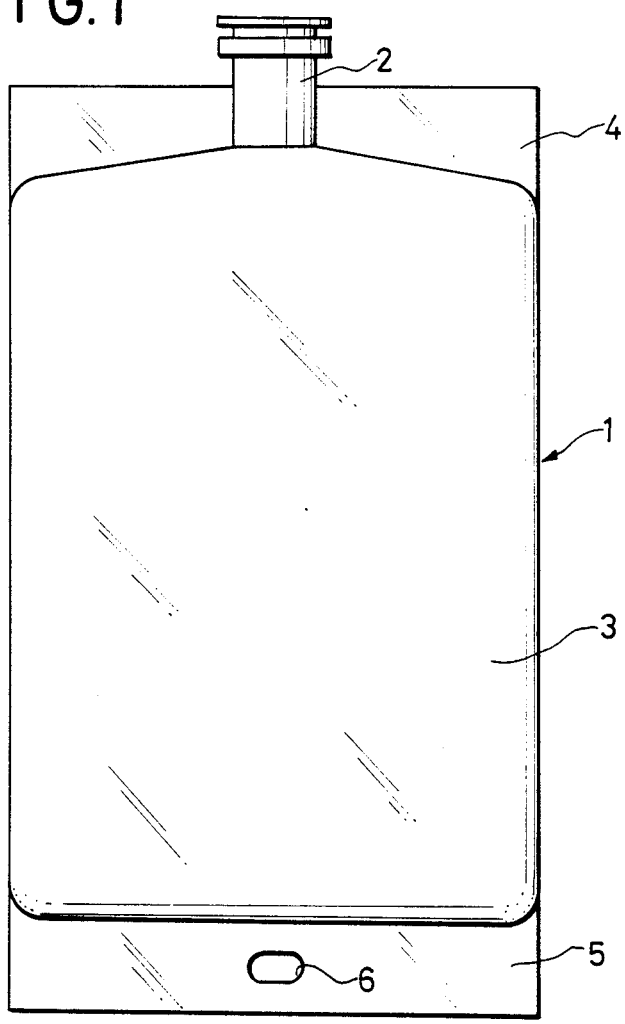
FIG. 1 is a plan view of a medical bag prepared in accordance with a melting/bonding method of the present invention.

| 1 Medical bag | 2, 82, 92 Mouth portion |
| --- | --- |
| 3, 83, 93 Receiving portion | |
| 4, 84, 94 Upper end portion | |
| 5 Lower end portion | 6 Suspension hole |
| 7, 87, 97 Heating element | |
| 8, 88, 98 Pressing member | |
| 9, 89, 99 Induction coil | |

DETAILED DESCRIPTION OF THE INVENTION

When a ferromagnetic heating element is placed in a high-frequency magnetic field, heat is effectively generated due to hysteresis loss and Joule effect of eddycurrent. A calorific value $P_1$ due to the hysteresis loss can be represented by the following formula:

$$P_1 = \frac{I^2}{d\sqrt{\mu \cdot r \cdot f}} (10^{-9}) \qquad (1)$$

wherein I is a coil current, d is a distance between the heating element and a coil, $\mu$ is an effective permeability, r is a resistivity and f is a frequency.

Further, a calorific value $P_2$ due to the Joule effect of the eddycurrent can be represented by the following formula:

$$P_2 = K \cdot N^2 \cdot I^2 \sqrt{\rho \cdot \mu \cdot F} \qquad (2)$$

wherein K is a specific constant, N is the number of turns of the coil, and $\rho$ is an electric resistivity.

As is apparent from the formulae (1) and (2), the calorific value $P_2$ due to the Joule effect of the eddycurrent is much larger than the calorific value $P_1$ due to the hysteresis loss. Therefore, the ferromagnetic substance having the great effective permeability $\mu$ can generate greater heat and therefore can sufficiently melt and bond a thermoplastic resin which is a material to be bonded.

The thermoplastic resins which cannot be melted and bonded by a high frequency have a small dielectric loss, and examples of such resins include polyolefin resins such as polyethylene and polypropylene as well as thermoplastic polyurethanes. As a heating element which is positioned at a site between bond surfaces of the thermoplastic resin which cannot be melted and bonded by a high frequency, there can be used conductors such as iron, ferrite, stainless steel, aluminum and the like which are ferromagnetic substances as well as mixtures of powders of these conductors and the thermoplastic resins.

Melting/bonding a mouth portion and a receiving portion of a medical bag by means of HF induction heating can be carried out by positioning the heating element between bond surfaces of the mouth portion and the receiving portion, and causing the heating element to release heat in a magnetic field in order to melt resins on the bond sides of the mouth portion and the receiving portion and to thereby bond them together. At this time, it is important that the bonding is accomplished by melting the resins, in the vicinity of the heating element, of the mouth portion and the receiving portion. That is, the melted resins of the mouth portion and the receiving portion are brought into contact with each other so as to bond the mouth portion and the receiving portion together, with the result that great bond strength can be obtained. Furthermore, since the heating element is completely covered with the resins constituting the mouth portion and the receiving portion, the selected heating element does not affect a drug or the like in the medical bag.

Moreover, in the medical bag of the present invention, the mouth portion and the receiving portion are bonded by melting the resins on the bond sides thereof, and therefore the bonding can be perfectly and beautifully achieved, as in the case that polyvinyl chloride resin is melted and bonded by a high-frequency bonding process utilizing internal heat release.

Now, the present invention will be described in detail in reference to accompanying drawings.

Figure 2:
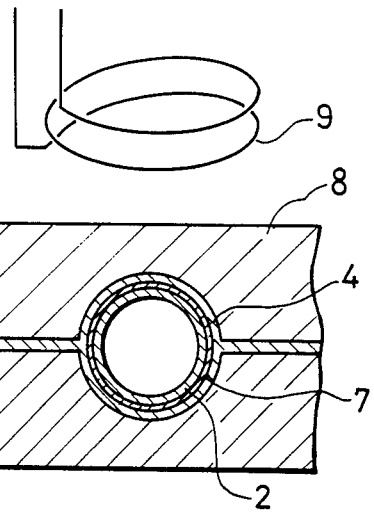
FIG. 2 is a sectional view illustrating a melting/bonding method of a mouth portion of the medical bag.

FIG. 1 shows a flexible medical bag 1 according to the present invention. This medical bag is composed of a mouth portion 2 and a receiving portion 3. The mouth portion 2 is made from a high-density polyethylene by injection molding. The receiving portion 3 can be prepared by bonding both the open ends of a tubular sheet which has been made from a linear low-density polyethylene by inflation molding. Further, the receiving portion 3 can also be prepared by overlapping two sheets obtained by extrusion, and bonding peripheral edges thereof. A lower end portion 5 of the receiving portion 3 is bonded by usual heat sealing and is provided with a suspension hole 6. The mouth portion 2 is bonded to an upper end portion 4 of the receiving portion 3 by a method of the present invention. The bonding method of the mouth portion 2 to the upper end portion 4 is shown in FIG. 2. A stainless steel mesh is selected as a heating element 7 and is mounted on the outer periphery of the mouth portion 2. The mouth portion 2 equipped with the stainless steel mesh is then inserted into the upper end portion 4, and they are pressed from the outside by a pressing member 8 and are then placed in a high-frequency magnetic field while pressed thereby. The stainless steel mesh generates heat, so that a linear low-density polyethylene of the upper end portion 4 and a high-density polyethylene of the mouth portion 2 are melted, contacted and bonded mutually in the vicinity of and in openings of the heating element. At this time, the stainless steel mesh is completely covered with the melted resins of the linear low-density polyethylene of the upper end portion 4 and the high-density polyethylene of the mouth portion 2. The high-frequency magnetic field is provided by causing a high-frequency current to flow through a induction coil 9. A high frequency of from 400 kHz to 4 MHz is usually selected.

Figure 3:
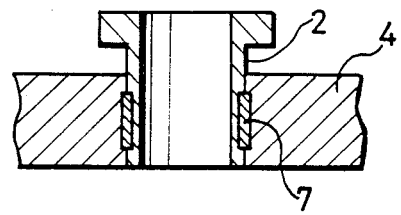
FIG. 3 is a sectional view of the bonded mouth portion.

A sectional view of the bonded mouth portion 2 is shown in FIG. 3. The high-density polyethylene of the mouth portion 2 and the linear low-density polyethylene of the upper end portion 4 are melted and bonded airtightly in the vicinity of and in openings of the stainless steel mesh. In the embodiment shown in FIG. 3, the upper end portion 4 is bonded by the usual heat sealing except for the bonded section of the portions 2 and 4, but the bonding of this upper end portion 4 may also be performed by using the stainless steel mesh in accordance with the bonding method of the present invention.

Figure 4:
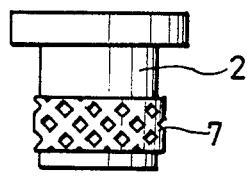
FIGS. 4 to 6 are plan views illustrating structures of heating elements.
Figure 5:
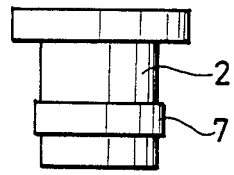
Figure 6:
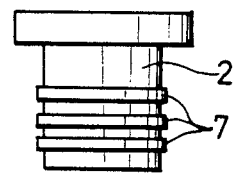
Figure 7:
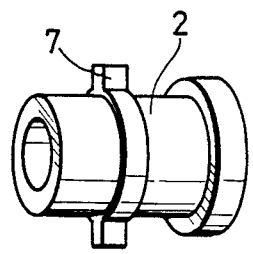
FIG. 7 is a perspective view illustrating another structure of the heating element.

With regard to the structure of the heating element, the mesh structure, in FIG. 4 which has been used in the above embodiment is suitable, and a strip structure in FIG. 5 and a line structure composed of several lines in FIG. 6 may also be used. Further, a ring having wings in FIG. 7 may likewise be employed. Above all, the ring structure heating element having wings in FIG. 7 is preferable, because in bonding the mouth portion and the receiving portion of the medical bag, the ring structure having wings permits more securely bonding the boundary between the curved surface and the plane surface thereof. In any case, it is necessary to use the heating element having a smaller area than that of the bond surface of each thermoplastic resin to be bonded.

Figure 8:
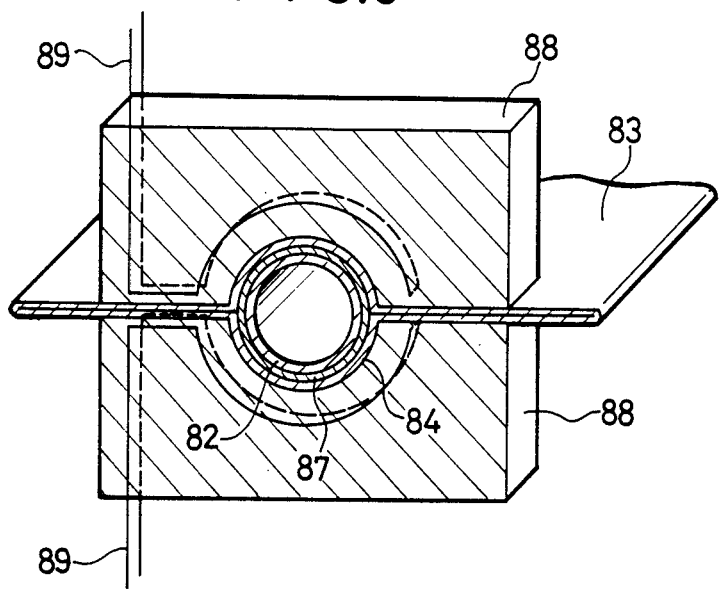
FIG. 8 is a perspective sectional view illustrating another melting/bonding method of the mouth portion.

Furthermore, FIG. 8 shows another method for preparing the medical bag according to the present invention. A stainless steel mesh ring which is a heating element 87 is mounted on the outer periphery of a mouth portion 82, and the latter is inserted into an upper end portion 84 of the medical bag. Afterward, the upper end portion 84 in which the mouth portion 82 is set is pressed from the outer periphery thereof by a ceramic pressing member 88. An induction coil 89 is built in the ceramic pressing member 88, and when a high-frequency current is caused to flow through this induction coil 89, the heating element 87 is heated. At this time, the ceramic pressing member 88 which is nonmagnetic does not release any heat, and the resins in the vicinity of the heating element 87 are only heated, so that the mouth portion 82 and the upper end portion 84 are bonded together.

Next, still another method for preparing the medical bag according to the present invention will be explained in reference to FIG. 9. A stainless steel mesh ring which is a heating element 97 is mounted on the outer periphey of a mouth portion 92, and the latter is inserted into an upper end portion 94 of the medical bag. Afterward, in an induction coil 99, the upper end portion 94 in which the mouth portion 92 is set is pressed from the outer periphery thereof by a ceramic pressing member 98. When a high-frequency current is caused to flow through this induction coil 99, a magnetic field is generated in the induction coil 99 and the heating element 97 is heated, so that the resins in the vicinity of the heating element 97 are melted and the mouth portion 92 is bonded to the upper end portion 94.

Figure 9:
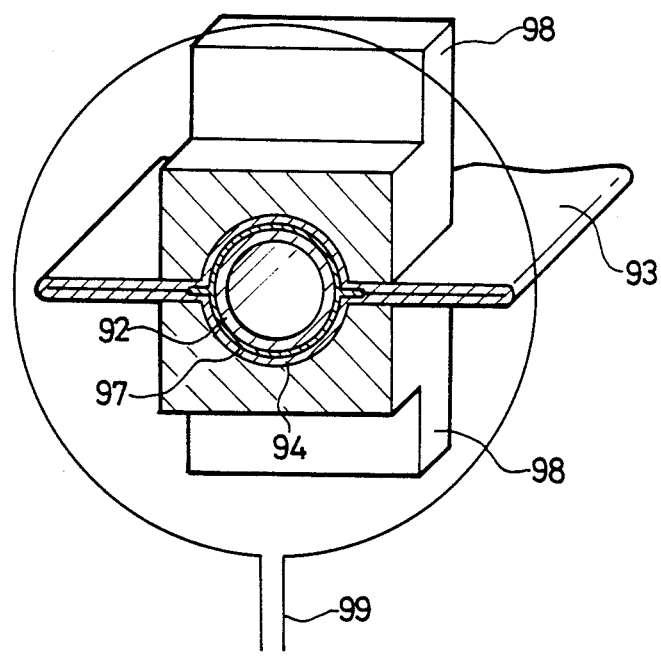
FIG. 9 is a prspective sectional view illustrating still another melting/bonding method of the mouth portion.

As shown in FIGS. 8 and 9, the induction coil is preferably arranged outside the cylindrical heating element so as to be spaced as equal as possible from the heating element. That is, when intensity of the magnetic field around the heating element is uniform, the heating element can generate heat uniformly, whereby the mouth portion and the upper end portion can be bonded together securely. In particular, the reason why the uniform heat release is required is that the wall of the upper end portion of the bag is thinner than that of the mouth portion, and therefore in the section in which the heat release is great, pinholes are liable to be formed; the section in which the heat release is small is liable to be poorly bonded.

In addition, it is preferred that the high-frequency current is caused to flow through the induction coil in a pulse state. When the high-frequency current is caused to flow in the induction coil in the pulse state, the resins in the vicinity of the heating element can be gradually melted and bonded under pressure, and therefore the mouth portion having the great wall thickness can be bonded securely to the upper end portion having the small wall thickness.

A drug such as an infusion fluid is poured into the medical bag 1, and the latter is then sterilized by autoclave sterilization. Alternatively, this medical bag 1 is sterilized by ethylene oxide gas (EOG) sterilization, and afterward ED, the powder of an antibiotic or the like, or a liquid drug in which ED or the powder of an antibiotic or the like is dissolved is poured sterilely into the medical bag 1, followed by sealing the mouth portion 2.

EXAMPLE 1

A linear low-density polyethylene was inflation-molded to obtain a tubular sheet having a diameter of 130 mm and a wall thickness, of 0.25 mm. This tubular sheet was then cut so as to have a length of 250 mm. On the other hand, a mouth member having a structure shown in FIG. 7 was formed from a high-density polyethylene by insert molding, and a stainless steel mesh heating element was then mounted on the mouth member. One end portion (lower end portion) of the tubular sheet was thermally bonded by heat sealing. Afterward, the above mouth member was inserted into the other end portion (upper end portion) of the tubular sheet. A nonmagnetic ceramic support was inserted into the inside portion of the mouth member, and pressure was then applied from the outside by a nonmagnetic ceramic pressing member. The thus assembled bag was then placed in a high-frequency magnetic field, and at this time, the bond surfaces of the mouth member and the tubular sheet in the vicinity of the stainless steel mesh were melted, so that the mouth member and the tubular sheet were bonded to each other. Afterward, the remaining unbonded portion of the upper end portion of the tubular sheet was thermally bonded by a heat sealing process in order to prepare a bag for an infusion fluid.

Into the thus prepared bag for the infusion fluid, 520 ml of water was poured, and the opening of the mouth member was closed with a rubber stopper and was further sealed with a linear low-density polyethylene film.

Afterward, the bag for the infusion fluid was subjected to autoclave sterilization at 115° C. for 40 minutes. At this time, remarkable deformation of the bag and leakage of the liquid contents therein were not observed.

POSSIBLITY OF UTILIZATION IN INDUSTRY

The inventors of the present application have found that thermoplastic resin members which cannot be bonded by high-frequency bonding, even if having an intricate shape and being different in wall thickness, can.be easily bonded and cooled in a short time, which permits mass production, and a finish state of the bonding is beautiful, when a ferromagnetic heating element is disposed in at least a portion between the bond surfaces of the thermoplastic resins, and the heating element is induction-heated from the outside to generate heat, so that the thermoplastic resins in the vicinity of the heating element are melted and bonded to each other. On the basis of this knowledge, the present invention has been completed.

The bonding method of the present invention has the following advantages:

A suitable medical bag can be provided without limiting raw materials, and for example, it can be prepared by the use of a polyolefin resin or the like which has a small dielectric loss and which cannot be bonded by high-freguency bonding. Further since the medical bag according to the present invention is obtained by melting and bonding the resin surfaces of a mouth portion and a receiving portion of the medical bag, the bonding state is perfect and there is little danger of contamination of contents in the bag. In addition, the heating element itself is not directly brought into contact with the drug in the medical bag, and therefore it is safe. Moreover, the method of the present invention can be carried out in a low manufacturing cost and therefore it is economical.

What is claimed:

1. A medical bag made from a thermoplastic resin and having a mouth portion and a receiving portion which is prepared by prepositioning a ferromagnetic heating element between the mouth portion and the receiving portion, and causing the heating element to generate heat by high frequency induction heating, whereby the mouth portion and the receiving portion are fused together.

2. A medical bag according to claim 1 wherein the mouth portion and the receiving portion are directly thermally bonded in the vicinity of the heating element, and the heating element is completely covered with the thermoplastic resin constituting the mouth portion and the receiving portion.

3. A medical bag according to claim 2 wherein the thermoplastic resin is a polyolefin resin.

4. A medical bag according to any one of claim 3 wherein the heating element is made from at least one of the ferromagnetic group consisting of iron, ferrite, stainless steel and aluminum.

5. A medical bag according to claim 4 wherein the heating element is a ring having a wing.

6. A method for preparing a medical bag which comprises the steps of forming a mouth portion and a receiving portion from a thermoplastic resin, positioning a ferromagnetic heating element between the mouth portion and the receiving portion, and irradiating magnetically said element causing it to generate heat by high frequency induction heating, whereby the mouth portion and receiving portion are melted and bonded together in the vicinity of the heating material.

7. A method for preparing a medical bag according to claim 6 wherein the melting and bonding are carried out while the mouth portion and the receiving portion between which the heating element is interposed are pressed.

8. A method for preparing a medical bag according to claim 7 wherein the high frequency induction heating is carried out by a pulse current.

9. A medical bag composed of thermoplastic resin and having defined mouth and receiving portions therein, said bag comprising a ferromagnetic heating element disposed between said mouth and said receiving portions, said element adapted for the generation of heat capable of fusing said resin when said element is subjected to a high frequency magnetic field, whereby the fusing of said resin bonds said mouth and receiving portions together embedding said element therebetween and therein.

* * * * *